United States Patent [19]

Grace

[11] 4,443,844
[45] Apr. 17, 1984

[54] HIGH FREQUENCY POWER SWITCHING CIRCUIT

[75] Inventor: Alan G. Grace, San Carlos, Calif.

[73] Assignee: Efflo Incorporated, Fort Worth, Tex.

[21] Appl. No.: 294,367

[22] Filed: Aug. 19, 1981

[51] Int. Cl.³ ............................................. H02M 7/537
[52] U.S. Cl. ....................................... 363/132; 363/98; 363/49; 363/56
[58] Field of Search .............................. 363/17, 22–26, 363/49, 56, 97–98, 132–134; 331/113 R, 113 A, 114, DIG. 2

[56] References Cited

U.S. PATENT DOCUMENTS

| 3,683,208 | 8/1972 | Burens | 363/134 X |
|---|---|---|---|
| 3,859,583 | 1/1975 | Reed | 363/26 |
| 4,178,628 | 12/1979 | Shepard, Jr. | 363/134 X |
| 4,348,719 | 9/1982 | Hicks et al. | 363/132 |

Primary Examiner—Peter S. Wong
Attorney, Agent, or Firm—Wofford, Fails & Zobal

[57] ABSTRACT

Two power switching transistors have their emitter and collector connected together respectively. A high level DC voltage is connected across the transistors. The junction of the two transistors is connected by way of a load sensing resistor to a power bus and to the primary of an auxilary transformer. A secondary of the auxiliary transformer is coupled to the input of a transcondance limiting amplifier whose output is coupled to a drive amplifier. The output of the drive amplifier is coupled to the primary of a timing transformer. Two secondaries of the timing transformer are coupled to the two transistors respective for providing drive for the transistors. The auxiliary transformer, transconductance amplifier, drive amplifier, and timing transformer are coupled together in a positive feedback loop forming a high frequency oscillator with the two transistors for converting the DC voltage to a high frequency voltage. A symmetry control circuit is coupled from the secondary of the auxiliary transformer to the output of the transconductance amplifier. A boost transformer is provided having its primary connected across the load sensing resistor and its secondary connected in a series aiding configuration with the primary of the timing transformer.

34 Claims, 6 Drawing Figures

HIGH FREQUENCY POWER SWITCHING CIRCUIT

BACKGROUND OF THE INVENTION

1. Field of the Invention

This invention relates to a circuit for converting a high level DC voltage to a high frequency voltage for use for powering electrical equipment.

2. Description of the Prior Art

Prior art power switching circuits for converting a high level DC voltage to a high frequency voltage employ two power transistors wherein the emitter of one transistor is connected to the collector of the other transistor. A high level DC voltage is connected across the two transistors. The junction of the two transistors is connected to one side of the primary of a transformer, the other side of the primary being connected to a half wave bridge across the DC power supply. The transformer has several secondaries which serve as separate channels for the high frequency voltage produced. An oscillator, comparator and base drive unit is provided which basically is an oscillator typically oscillating in the region of 20-30 khz. The output of the oscillator alternately switches the two transistors on and off to convert the DC voltage to a high frequency voltage. One of the channels is fed back to the oscillator, comparator and base drive unit for regulation purposes. A start circuit employing a transformer is coupled to the oscillator, comparator and base drive unit. Circuits of this type have disadvantages since they have only one regulated channel. Moreover, not only are the two power transistors and their associated oscillator, comparator, and base drive unit a chopper (converts the high level DC voltage to a high frequency voltage) but they also act as modulator. The net effect is that it is impossible, over the very large dynamic ranges which occur, to maintain symmetrical positive and negative areas of the waveform at the junction of the two transistors. The non-symmetrical areas also occur because of the dis-similarities of the transistors. Matching of transistors, however, will not eliminate the non-symmetrical waveform since the circuit must carry out the functions of both chopping and modulation over a wide dynamic range. The transformers used employ gapped cores rather than the highly efficient toroidal non-gapped cores. This is due to the fact that a non-symmetrical wave form results in a DC component which would quickly saturate a non-gapped toroidal core. A gapped core results in a large leakage inductance which produces switching spikes. This in turn requires power switching transistors with increased voltage capabilities which increases the cost. Moreover transformers with gapped cores require more current for operation. The prior art power switching circuits require as much as 20% of the total load current for operation. The increased current for operation also requires power transistors with high voltage capabilities. In addition the capacitors of the half wave bridge must be larger. Moreover, transformers with gapped cores result in more radiation of flux and noise which interferes with associated equipment and with the AC power supply from which the DC is obtained. The prior art power switching circuits are designed such that the power switching transistors are driven hard even under no load conditions to accomodate the worse expected conditions. This adversely affects their switching times.

SUMMARY OF THE INVENTION

It is an object of the present invention to provide a high frequency power switching circuit that does not have the above mentioned disadvantages. Modulation is carried out by each channel whereby chopping is the only function carried out by the circuit. This plus other features allow the highly efficient non-gapped toroidal cores to be used for the transformers.

The high frequency power switching circuit of the present invention comprises two power switching means coupled together, means for connecting a DC voltage across said two power switching means, and a saturable timing transformer having a primary winding and two secondary windings. One of said secondary windings is coupled to one of said power switching means for driving said one power switching means. The other of said secondary windings is coupled to the other of said power switching means for driving said other power switching means. An output lead is coupled to the junction of said two power switching means. Amplifier means is provided having an input coupled to said output lead and an output coupled to said primary winding of said timing transformer. Said amplifier means and said timing transformer are coupled in a positive feedback loop whereby said two power switching means, said amplifier means, and said timing transformer form an oscillator for alternately switching said two power switching means on and off to convert said DC voltage to a high frequency voltage at said output lead.

In the embodiment disclosed, said two power switching means comprise two transistors. The amplifier means is operated as a limiter to insure that the going off transistor is completely off before the going on transistor is on.

In a further aspect, a resistor means in coupled to said output lead. A boost transformer is provided having a primary winding connected across said resistor means and a secondary winding connected in a series aiding configuration with said primary winding of said timing transformer.

In another aspect, circuitry is coupled from said output lead to said output of said amplifier means for applying to said output of said amplifier means, a DC signal having a polarity which is a function of the lack of symmetry of the voltage wave form at the junction of said two power switching means. In addition said amplifier means is characterized such that an input may be applied thereto to change the level of the output such that said oscillator may be phasedlocked to a given frequency.

DETAILED DESCRIPTION OF THE PREFERRED EMBODIMENTS

Figure 1:
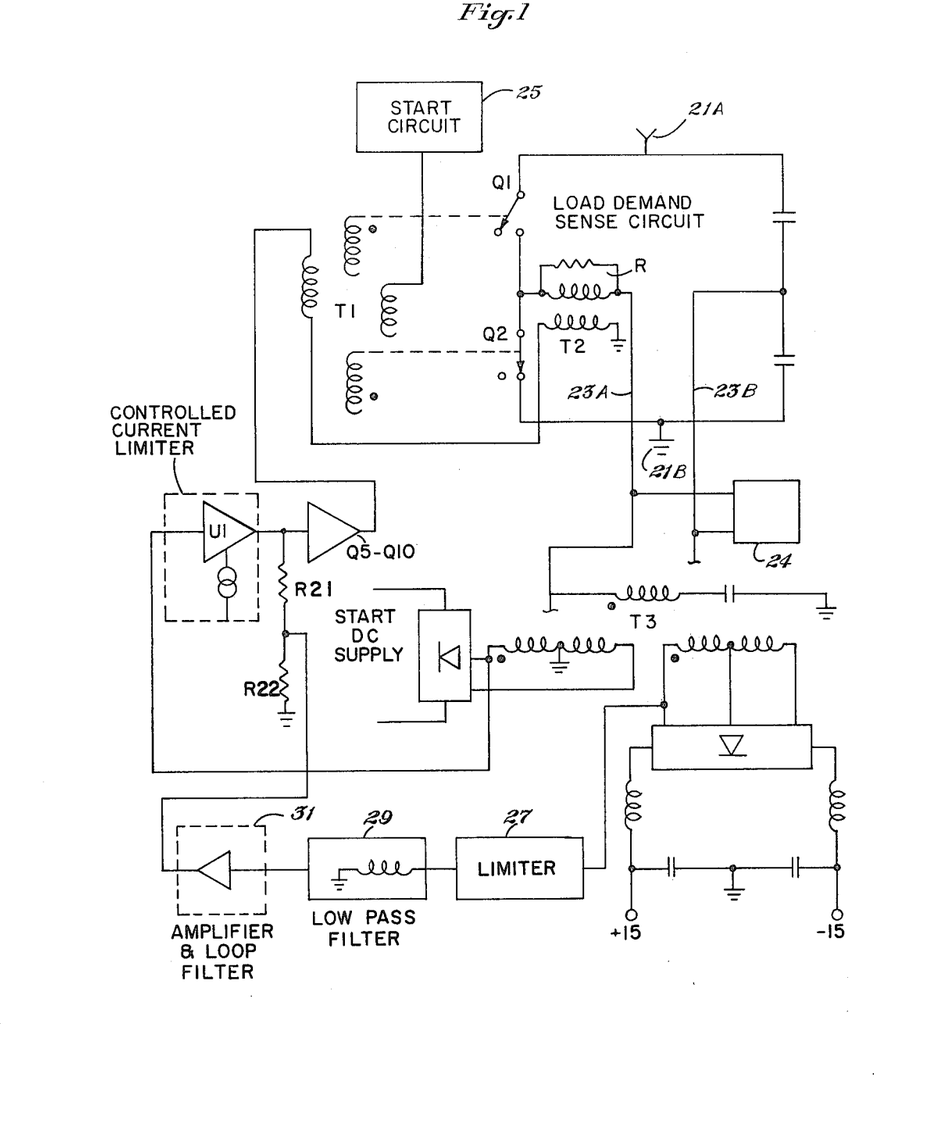
FIG. 1 is a schematic of the circuit of the present invention.

Referring now to FIG. 1, the high frequency power switching circuit comprises power switching transistors Q1 and Q2, an auxiliary transformer T3, amplifier limiter U1, drive amplifier formed by transistors Q5–Q10, and timing transformer T1 connected together in a positive feedback loop forming a high frequency oscillator. A high DC voltage is applied to terminals 21A and 21B, which is converted by the oscillator to a high frequency voltage at power bus leads 23A and 23B. This high frequency voltage is applied to operate various types of electrical equipment connected to leads 23A and 23B such as small office computers, etc. In FIGS. 1 and 3B reference numeral 24 identifies channels incorporating such electrical equipment which may employ magnetic or other types of modulators to regulate for different load requirements. In one embodiment the voltage applied to terminals 21A and 21B may be 300 volts DC. The oscillator may oscillate at 30 khz to convert the 300 volts DC to a 30 khz voltage at bus leads 23A and 23B. The voltage at these leads cycles from zero to 150 volts positive to 150 volts negative. The frequency of oscillation is initially set by amplifier U1 and is controlled by transformer T1. Two secondary windings of T1 provide the drive for Q1 and Q2 respectively. The oscillator through transformer T1 alternately switches transistors Q1 and Q2 on and off to convert the DC voltage applied to terminals 21A and 21B to the high frequency voltage at leads 23A and 23B. Amplifier U1 acts as a limiter and insures that the going off transistor is completely off before the going on transistor goes on. This prevents both transistors Q1 and Q2 from being on at the same time which would otherwise provide a direct short to ground. The output of amplifier U1 is independent of the rectified power line ripple frequency which exist on the power supply. Thus the frequency of the oscillator is not modulated by the 120 hz power supply ripple frequency.

A start circuit 25 is provided for the oscillator. Immediately after the oscillator has started, transformer T3 provides a start DC supply for amplifier U1 and then provides low level power for amplifier U1 and for the equipment connected to leads 23A and 23B.

The output of transformer T3 also is applied to a limiter 27, a low pass filter 29, DC component error and loop filter 31 and to the junction of resistors R21 and R22, which is coupled to the output of amplifier U1. This circuit compensates for the variation in storage times of transistors Q1 and Q2 to achieve an almost perfect squarewave at the junction of the emitter of Q1 and the collector of Q2 and to remove the DC component detected in the error amplifier 31. Thus transistors Q1 and Q2 do not have to be matched and high efficient non-gapped torroidal cores may be employed by transformers T1, T2 and T3.

Transformer T2 is a boost transformer. It has its primary connected across resistor R and its secondary connected in a series aiding configuration with the primary of timing transformer T1. The current through R varies linearly as a function of the current demand of the load. By way of transformers T2 and T1, this current provides a base drive for transistors Q1 and Q2 which is a function of the load demand.

Provision also is made allowing a phase lock signal to be applied to amplifier U1 to lock the oscillator to a given frequency or to lock a number of the oscillators together in a given phase relationship to obtain increased power at the output of a common transformer to which the power bus leads 23A and 23B of each oscillator may be connected.

Figure 2:
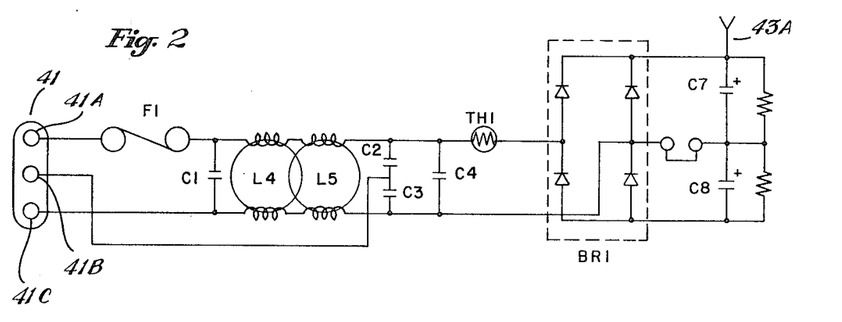
FIG. 2 is an electrical schematic of the DC power supply.

Referring now to FIG. 2, the DC power supply for the circuit of FIG. 1 comprises a 3 pin plug 41 where 115 volts AC is applied. The plug 41 has an AC high input 41A, a ground input 41B and an AC low input 41C. The circuit comprises a fuse F1; a filter comprising inductors L4 and L5 and capacitors C1, C2, C3 and C4; a thermistor THI; a bridge BRI and a full wave doubler comprising capacitors C7 and C8. The filter reduces drastically the radio frequency current caused by the high frequency switching from getting back into the power lines. Three hundred volts DC is obtained across capacitors C7 and C8 from terminal 43A to ground. Terminal 43A is connected to each of terminals 21A of FIGS. 3A and 3B.

Figure 3A:
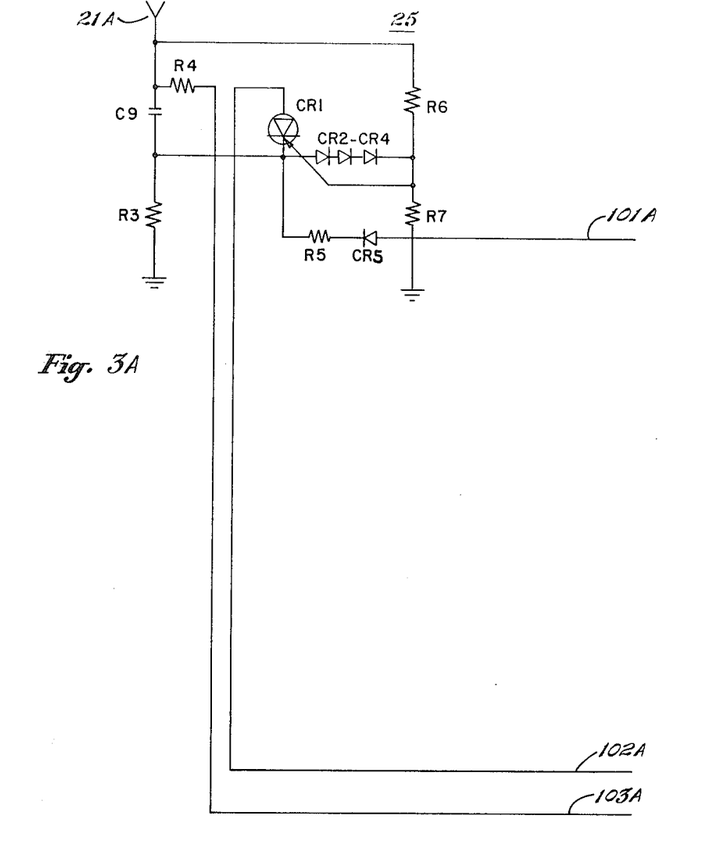
FIGS. 3A, 3B, 3C and 3D are a detailed electrical schematic of the system of FIG. 1.
Figure 3B:
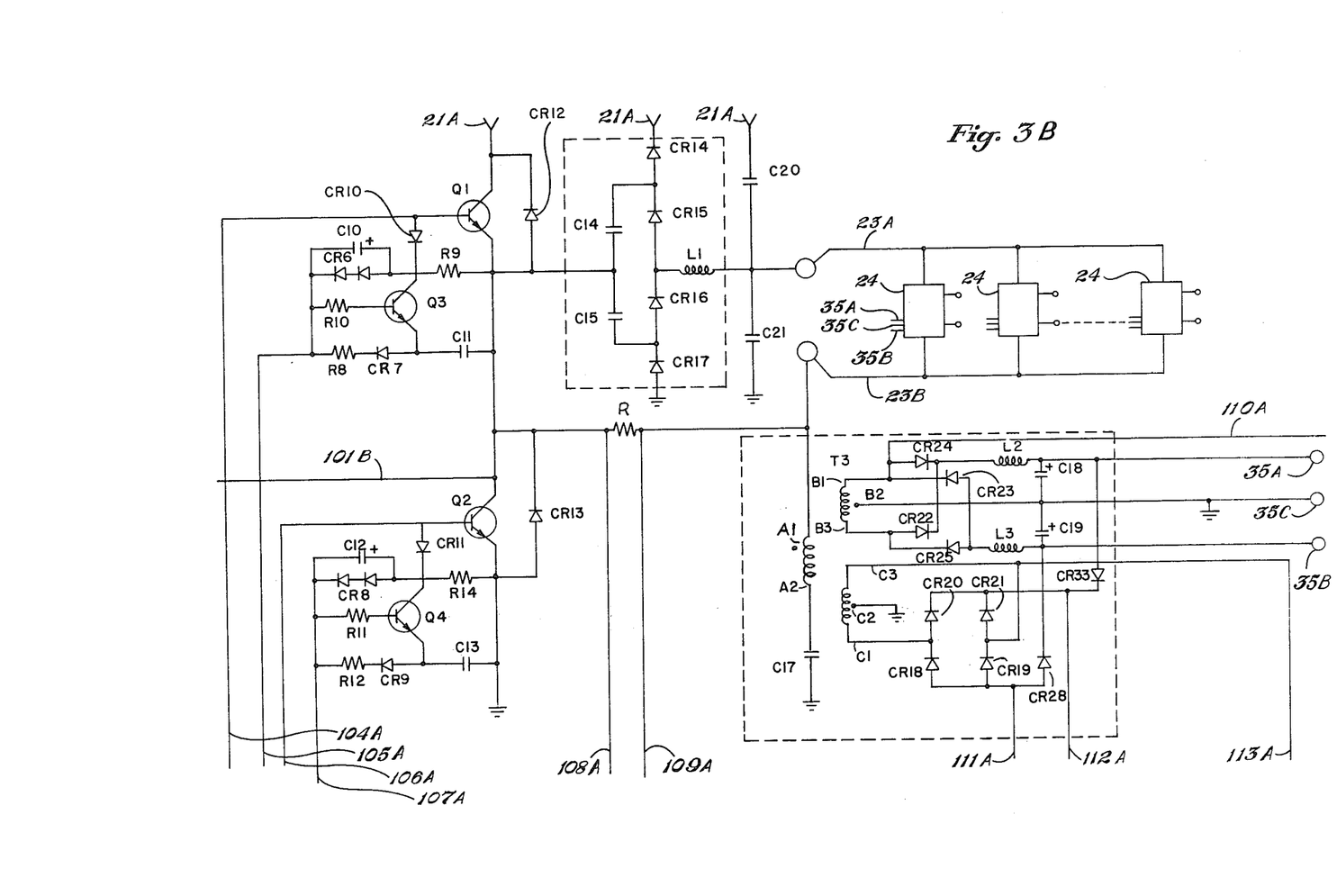
Figure 3C:
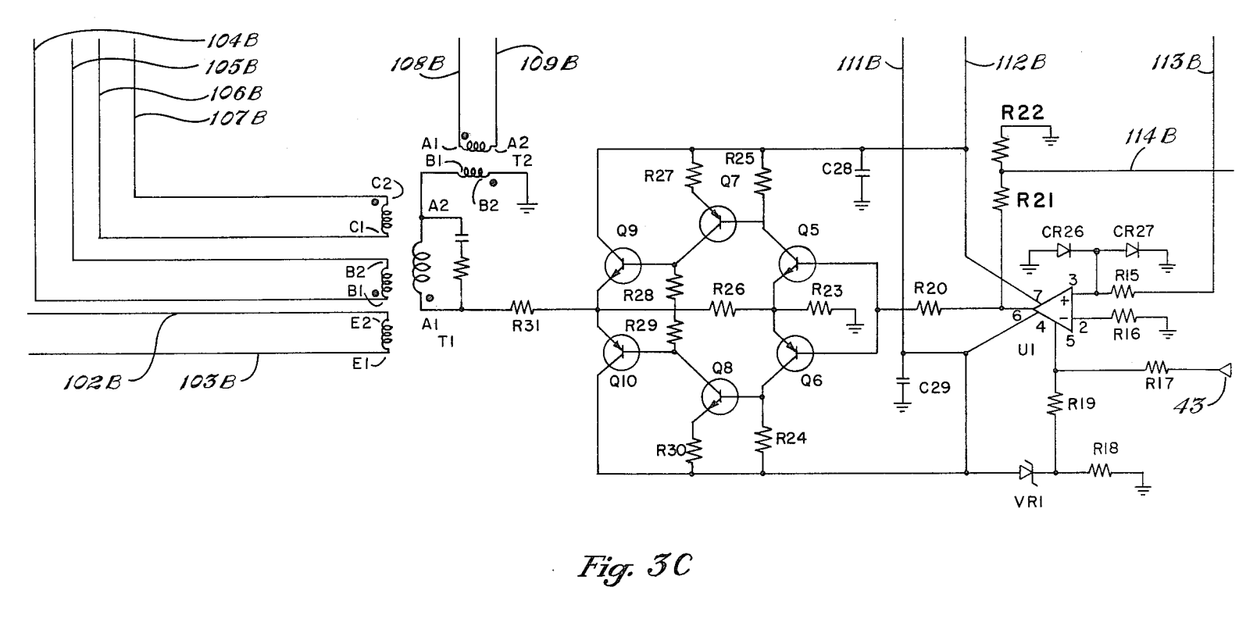
Figure 3D:
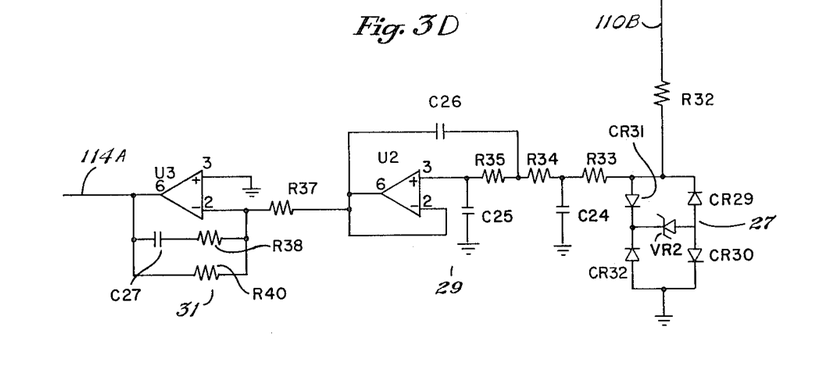

Referring now to FIGS. 3A, 3B, 3C and 3B, the electrical connections between the components of these FIGS. are as follows. Lead 101A of FIG. 3A is connected to lead 101B of FIG. 3B. Leads 102A and 103A of FIG. 1 are connected to leads 102B and 103B of FIG. 3C respectively. Leads 104A, 105A, 106A, and 107A of FIG. 3B are connected to leads 104B, 105B, 106B and 107B respectively of FIG. 3C. Leads 108A and 109A of FIG. 3B are connected to leads 108B and 109B respectively of FIG. 3C. Lead 110A of FIG. 3B is connected to lead 110B of FIG. 30. Leads 111A, 112A and 113A of FIG. 3B are connected to leads 111B, 112B and 113B respectively of FIG. 3C. Lead 114A of FIG. 3D is connected to lead 114B of FIG. 3C.

Timing transformer T1 comprises a primary winding T1(A1-A2) and three secondary windings T1(B1-B2), T1(C1-C2), and T1(E1-E2). The start circuit 25 comprises control rectifier CR1 which with capacitor C9, and resistors R3, R6 and R7 form an oscillator which operates at about 300 hz. Resistor R4 is part of the output of the oscillator. One side of secondary winding T(E1-E2) is connected to R4 and the other side is connected to the anode of CR1. Diodes CR1, CR2 and CR3 connected across the gate of the cathode function limit the negative voltage on CR1 to prevent it from going into a destruction mode.

Secondary winding T1(B1-B2) is connected to the base-emitter circuit of Q1 and secondary winding T1(C1-C2) is connected to the base-emitter circuit of Q2.

Initially when the system is switched on there is no base drive to Q1 or to Q2 and the power oscillator does not oscillate. Immediately after the system is switched on, power becomes available and the potential on the cathode of CR1 starts to drop as C9 charges toward common. When the cathode of CR1 goes negative relative to its gate, CR1 conducts and discharges C9 through CR1 by way of start winding T1(E1-E2). This produces approximately a 2 amp pulse at the start winding T1(E1-E2). This pulse produces approximately a ½ amp pulse in windings T1(C1-C2) and T1(B1-B2). These pulses are of opposite polarity such that the positive pulse which is applied to the base of Q1 or Q2 drives that transistor on. Normal oscillation then will start. When that occurs, diode CR5 conducts and cuts CR1 off which remains off.

The junction of the emitter of Q1 and the collector of Q2 is connected by way of resistor R to one side of the primary winding T3(A1-A2) of auxiliary transformer T3 which has two secondary windings T3(B1-B3) and T3(C1-C3). The other side of primary winding T3(A1-A2) is connected through capacitor C17 to ground. Transformer T3 is a step down transformer. Thus transformer T3 transforms, by way of its secondary windings, the voltage excusions at the junction of Q1's emitter and Q2's collector to lower voltage levels usable by the operational amplifier U1 of the subject circuit and by the operational amplifiers of the electronic equipment 24 connected to leads 23A and 23B. Fifteen volts positive and negative are available on leads 35A and 35B respectively. Lead 35C is a ground connection. Leads 35A, 35B and 35C are connected to the electronic equipment 24.

Terminal C3 of secondary winding T3(C1-C3) is connected by way of resistor R15 to input pin 3 of U1 which is also known as a transconductionce amplifier. At switch on, a starting circuit for U1 and transistor drive Q5-Q10 is obtained from winding T3(C1-C3) and a diode bridge network comprising diodes CR18, CR19, CR20 and CR21. After start up of the oscillator, the voltage supplied to these circuits comes from the main auxiliary power supply by way of capacitors C18 and C19. This circuit is too slow for a start up system due to inductors L2 and L3. The voltage across T3(C1-C3) is about 70% of the voltage across T3(B1-B3). The positive supply to pin 7 of U1 is applied from the common cathode junction of CR20 and CR21. The negative supply to pin 4 of U1 is applied from the common anode junction of CR18 and CR19. Upon start up and when the emitter-collector junction of Q1 and Q2 first goes positive, a pulse is present across T3(C1-C3). This pulse is full wave rectified and provides a pulse transient voltage on C28 and a minus transient voltage on C29. This is sufficient to allow normal operation of U1 and drive transistors Q5-Q10 for application of a voltage to timing transistor T1. Thus once a pulse is applied from the starting circuit 25 to make either Q1 or Q2 conduct, a continuous path is applied from the junction of Q1's emitter and Q1's collector through T3, U1 and drive transistors Q5-Q10 to sustain oscillation. Once oscillation has started properly, the main auxiliary power supply +15 volts at the top of C18 and −15 volts at the bottom of C19, biases off the bridge network CR18-CR21 and takes over as the power source for U1, the operational amplifiers of equipment 24 and for drive transistors Q5-Q10.

Transconductance amplifier U1 operates in a switched current mode. From terminal 5 of U1, which is the set current terminal, there is a connection through R19 to the anode of zenor diode VR1. The anode of VR1 is connected to ground by way of R18. There is approximately 5.6 volts with respect to the negative supply at the junction of R19 and R18. Resistor R19 sets the current into U1. The basic period of oscillation of the oscillator Q1, Q2, T3, U1, Q5-Q10 and T1 is set by the amount of current that is established in R19. This current is alternately switched positive and negative by U1 at its output terminal 6 into resistor combination R21 and R22 producing a voltage which goes positive and negative. The current established by R19 may be about ½ m.a. U1 switches this ½ m.a. of current positively and negatively into R21, R22. These resistors are of such a value that a square wave of approximately 5 volts peak to peak is produced at terminal 6 of U1 with respect to ground.

Transistor combination Q5-Q10 comprises a wide band high frequency voltage amplifier with a low output impedance. It has a gain of two set by resistors R26 and R23 which are equal in resistance. The voltage available, approximately zero to a peak of 10 volts, is applied through a small limiting resistance R31 to the primary connections T1(A1-A2) of timing transformer T1. This voltage across T1(A1-A2) is transformed in windings T1(C1-C2) and T1(B1-B2) and is applied to the base emitter junctions of Q2 and Q1 respectively.

The frequency of timing transformer T1 is linearly proportional to the amplitude of the voltage applied to its primary. It has a non-gapped ferrite core which is allowed to saturate. Thus there will be a time integral of voltage and current through its primary and given sufficient time the transformer will saturate. The higher the voltage existing at T1(A1-A2), the higher the frequency of operation since T1 will saturate sooner. Thus any mechanism that can change the voltage existing at terminal 6 of U1 and the output of the emitters of Q9 and Q10 will affect the frequency of operation of the oscillator. A junction is indicated between R21 and R22. This is a further point of modification of the voltage waveform existing at terminal 6 of U1. The input at the junction of R21 and R22 is used for symmetry control. In addition, a phase lock input applied to terminal 5 of U1 by way of R17 also will modify the frequency of T1. Boost transformer T2 also acts to modify the frequency of T1 as a function of the load demand on Q1 and Q2. These features will be discussed subsequently.

When T1 saturates, it can no longer sustain base drive to Q1 or Q2, through its secondaries. When this occurs, the loop is completely broken. Thus the drive to the on transistor is relaxed and it starts to turn off. The turn off time is a function of its storage time. When the drive is completely relaxed, the voltage across T3 has dropped such that the limiter U1 goes the other way. The transistor that was off is turned on. The basic frequency of the oscillator is set by the amount of current that is established in R19. The frequency of oscillation, however, is controlled by the saturation characteristics of T1.

As transistors Q1 and Q2 are alternately switched on and off, the voltage at their emitter collector junctions varies from about 300 to zero volts resulting in a squarewave at the junction. A voltage proportional to this voltage is fed by way of T3 and R15 to U1. Transconductance amplifier U1 has a very high gain and its purpose is to limit very close to the cross-over point of the square wave at the junction of Q1 and Q2. In other words it limits very close to the point where the going off transistor Q1 and Q2 reaches one-half of the supply voltage. Thus when Q1 is fully on its emitter is at 300 volts. When T1 saturates, Q1 will start to go off whereby its emitter voltage starts to fall. When the voltage at the junction of Q1 and Q2 reaches 150 volts, U1 switches and provides proper drive through T1 to switch Q2 on quickly. When Q2 goes on, it takes the 150 volts at the junction of Q1 and Q2 quickly down to zero. The voltage will remain at zero for that half cycle. When T1 again saturates and Q2 starts to go off, its collector voltage will start to rise. When it gets to 150 volts, U1 will switch through limiting action and drive Q1 on which then will cause the voltage at the junction of Q1 and Q2 to rise to 300 volts. Once T1 has saturated, the switching off time of Q1 or Q2 cannot be controlled to any great extent.

The characteristics of Q1 and Q2 are such that when either starts to go off and there is 50 or 60 volts across the transistor, the transistor is completely off. By switching the previously off transistor on when the voltage at the junction of Q1 and Q2 reaches 150 volts, a safely margin is provided to insure that the going off transistor is completely off before the other transistor is switched on. This insures that both transistors will not be on at the same time which would otherwise provide a short to ground. Amplifier U1 is a commercially available operational amplifier available from RCA and identified as CA3080. It is a transconductance amplifier whose gain is measured in amps per voltage input. It is operated in a switching mode (operated with no feedback loop) at a very high gain. Its gain is about 25,000 and it needs only 40 to 50 mv to saturate it in either direction. In other words, it needs very little voltage with respect to its grounded input to switch from full conduction in one state to full conduction in the other state. When used as a limiter, it will therefore pick the voltage which is near or just about at ground potential for its switching point. Thus for an approximate square wave at the junction of Q1 and Q2, the mid-point on the voltage scale 150 volts of that square wave will correspond to about the switching point of U1.

U1 is operated in the switching mode independently of the ripple voltage. Under load conditions, if one were to look at the voltage at the junction of Q1 and Q2, one would see a ripple of 120 hz on the voltage waveform due to the full wave voltage double rectification of the 60 hz AC input applied to plug 41 of FIG. 2. This ripple also is applied to T3 and to U1 by way of R15. Thus the waveform applied to U1 by way of T3 and R15 is modulated at 120 hz. As the equipment coupled to bus leads 23A and 23B draw power, the voltage waveform applied to U1 also is modulated as a function of the type of loading. It is desired to prevent these amplitude modulating components from passing to T1 because otherwise they will change the frequency of T1. These undesired amplitude modulating components of the waveform are removed by the limiting action of U1. Since U1 needs very little voltage with respect to its grounded input to switch from full conduction in one state to full conduction it the other state, it is very effective in removing the amplitude modulating components of the waveform applied to its input by way of R15.

The symmetry control of the system now will be described. Its purpose is to eliminate the need of matching transistors Q1 and Q2 to the same characteristics such as storage times in order to obtain symmetrical waveforms. This reduces cost and allows high efficient non-gapped torroid cores to be employed for transformers T1, T2 and T3. The output of T3(B1) terminal is applied by way of R32 to limiter 27 which comprises diodes CR29-CR31 and zenor diode VR2. The output at the junction of R32 and R33 is applied to low pass filter 29 which takes out the AC component of the limited waveform existing at the junction of R32 and R33. The DC gain of the combination operational amplifier U2, R33, R34, R35 and C24-C27 is unity. The output on terminal 6 of U2 is essentially DC. If the waveform at the junction of R32 and R33 was completely symmetrical i.e. the areas above and below the zero base line were equal, the output at terminal 6 of U2 would be zero volts. If the positive excursions existing at the junction of R32 and R33 is longer than the negative excursions (which would occur if Q1 has a longer storage time than Q2) there will be a positive voltage existing at terminal 6 of U2. If the negative excursion of the waveform at the junction of R32 and R33 is longer than the positive excursion, the output of terminal 6 of U2 would be negative.

The output at pin 6 of U2 is applied to amplifier and loop filter 31 comprising R37, operational amplifier U3 and R38, R40 and C27. This amplifier circuit has a gain of approximately 10. It amplifies the error or DC component which exists in the square wave at the junction of R32 and R33. This amplifier signal is applied from terminal 6 of U3 to the junction of R21 and R22. This is essentially a DC signal whose polarity will be a junction of the lack of symmetry in the squarewave existing at the junction of the emitter of Q1 and the collector of Q2. The polarity of the voltage added to the junction of R21 and R22 will bias the signal existing at terminal 6 of U1 and effectively through Q5-Q10 apply an assymetric drive signal to timing transformer T1. The net result of this is that the transistor, either Q1 or Q2 which exhibits the longer storage and total switching time will be switched on earlier. There is not much that can be done about the difference in the switching times of Q1 and Q2. The switching times include their fall time and storage time. The difference is made up by starting the slow transistor earlier. The net result is to achieve an almost perfect squarewave at the junction of the emitter of Q1 and the collector of Q2 and essentially remove the DC component detected by U2. As mentioned previously, the frequency of the oscillator is controlled by the amplitude of the voltage applied to the primary of timing transformer T1. Thus if the amplitude of either the positive or negative excursion of voltage that is applied to T1 is changed, the rate at which the onset of saturation occurs changes and hence the rate at which the voltage will collapse across both sets of secondary windings T1(B1-B2), T1(C1-C2) changes. The slower transistor will result in a larger voltage excursion (either positive or negative) applied to T1. The saturation time of T1 and consequently the drive applied to the slower transformer will occur faster because the voltage is greater and the current will integrate up quicker because of the higher voltage. Thus the period of the slower transistor is essentially shortened.

Referring now to boost transformer T2, its primary winding T2(A1-A2) is connected across resistor R which in turn is connected to the junction of the emitter of Q1 and the collector of Q2. The resistance of R is small, being of the order of 0.6 ohms. The secondary windings T2(B1-B2) of T2 are connected in a series aiding configuration with the primary windings T1(A-1-A2) of T2. The small voltage which exists across R is the primary voltage input to primary windings T2(A-1-A2) of T2. The current which is the total load current which flows through R is a sample of the load requirements of the power supply system and the voltage existing across R and therefore across T2(A1-A2) will be linear function of the current demand of the power supply. This in turn on a step up basis introduces a voltage across T2(B1-B2) of T2 and adds to the voltage already existing and provided by U1 together with power drivers Q5-Q10. Thus the voltage existing across T1(A1-A2) is boosted and therefore the voltage transformed through T1(B1-B2) and T1(C1-C2) is also boosted which affects a boost in the base drive as a function of load demand to Q1 and Q2. This feature thus incorporates an added drive voltage proportional to the load current such that the power transistors Q1 and Q2 are driven, for all load conditions, at a given forced Beta. In other words Q1 and Q2 are not overloaded when only a small output current is needed. In addition R provides a limiting resistance in series with the primary of timing transformer T1 to limit the current to a safe value when T1 saturates. Moreover, with R across the primary of T2, the boost circuit is essentially power matched to the source impedance of Q5-Q10. Thus very little power is used, however, there is still provided the current limits necessary when T1 saturates. In addition, by placing R across the primary of T2, there is reflected predominantly a very small resistance whereby the effective inductance which is reflected into the circuit from the output of Q9–Q10 and from the output of T1 is very small. This facilitates design of the base drive of Q1 and Q2.

Referring again to U1, it is seen that resistor R17 is connected to terminal 5. When a signal is applied by way of input 43 and R17, it will modify the current as set by VR1 and R19. When this occurs, a different value of current will be switched out of terminal 6 of U1 into R21 and R22 and therefore the voltage across R21 and R22 will be different from the nominal 5 volts mentioned above. It will be a linear function of the current that is fed into terminal 5 of U1. The purpose of input 43 is to allow a phase comparator to be coupled thereto in order to lock the oscillator to a desired frequency or to allow a number of the oscillators to be combined to increase the power output. In order to lock the oscillator to a given frequency, a signal will be applied to input 43 to effect the locking. In order to increase the power output, for example, three of the oscillators could be phase locked 120° apart. In this embodiment, the output buses 23A and 23B of three of the oscillators would be coupled to three primary windings of a three phase transformer and power taken off of the transformer. A signal would be applied to the input 43 of each of the three oscillators. These signals would be adjusted so that three frequencies of the three oscillators matched and the phases would be 120° apart. It is to be understood the two or four of the oscillators could be combined to increase the power. The ability to combine a number of smaller oscillators together to increase the power has advantages in that it is cheaper than building a single high power high frequency switching circuit.

Referring now to transistors Q3 and Q4, these transistors and their associated circuits are employed to hasten the end of the storage times of Q1 and Q2 during the switching of Q1 and Q2. Transistors Q3 and Q4 accomplish their function by removing base charges from Q1 and Q2 respectively when Q1 and Q2 saturate. The charges are removed linearly proportional to the load demand. As an example, the operation of Q4 will be described. It is noted that T1(C2) is connected to the junction of R11 and R12. When Q2 is driven on, C13 will be charged negatively through CR9. When a load demand occurs, it is sensed through R and T2 and increases the base drive of Q2 through T1. This also increases the negative charge on C13. The base potential of Q4 has been, up to this point in the cycle, negative with respect to its emitter potential. Thus Q4 has been off. When T1 saturates, the base drive current is terminated to Q2. At some point in time thereafter, the base potential of Q4 rises above its emitter potential and Q4 conducts. It conducts as a function of how much energy was stored on C13. When Q4 conducts after base drive to Q2 is removed, it conducts to remove the base charge to hasten the end of the storage time. Under a heavy load condition, Q2 will be driven hard and C13 will be charged negative extensively. When the base drive to Q2 is removed, Q4 conducts heavily to quickly remove the base charge from Q2. Under a light load condition, Q2 is not driven as hard and C13 is not charged as negatively. When the base drive to Q2 is removed, Q4 conducts less heavily. Transistors Q3 operates in a similar manner to remove base charges from Q1 after it saturates. Thus Q1 and Q2 are driven and charges are removed in a manner linearly proportional to load demand.

Referring now to diodes CR14, CR15, CR16, CR17, capacitors C14 and C15 and inductor L1 there will be described a non-dissipating snubbing and load line shaping network. Capacitors C14 and C15 are used to store energy during the time that Q1 and Q2 are on respectively. When Q1 and Q2 go off, the energy stored in C14 and C15 respectively allow current from C14 and C15 to continue in the inductive load and relieves the transistor Q1 or Q2 which is going off, of the burden of continuing to supply the stored energy in the inductor. There are no resistors in this snubbing system as there are in prior art systems whereby power dissipation in the present snubbing system is at a minimum. The total of the switching and saturation losses of the present type of power supply operated at 200 watts is about 2.5 watts. Thus the efficiency is very high.

The snubbing network operates as follows. Assume that Q1 has just switched on. Since the junction of diodes Cr15, Cr16 and inductor L1 are connected to one half of the supply voltage by C20 and C21, that junction will be about 150 volts positive DC with respect to ground. Assuming that Q1 is a perfect switch, the junction of C14 and C15 will be almost instantaneously at plus 300 volts. That 300 volt pulse will be transferred to the lower plate of C15 and immediately the anode of CR16 goes to plus 300 volts causing CR16 to conduct. Capacitor C15 and L1 form a resonant circuit which will swing down so that the anode of CR16 and the lower plate of C15 will swing down to essentially zero volts. At that point in time, C15 is charged to 300 volts and will stay charged as long as Q1 is on. When Q1 starts to go off because its base drive has been relaxed, C15 will discharge through CR12, continuing the load current through CR12, rather than through Q1, to the high frequency bus. This eliminates the need of Q1 continuing that load current as its voltage falls. This diverts the large instantaneous power dissipation which would otherwise occur through Q1 if it had to supply the decaying current as it went off. Capacitor C15 discharges through CR12, the power supply, C20, C21, ground and CR17 to the lower plate of C15.

When Q2 goes on, the lower plate of C14 is essentially connected to ground or to common. Since the junction of CR15 and CR16 is about 150 volts, a postive 150 volt pulse is fed CR15. Capacitor C15 and L1 form a resonate circuit which will swing up to 300 volts, charging the upper plate of C14 to plus 300 volts. When Q2 starts to go off, its current will be diverted by C14 discharging through a path comprising CR13, ground, C21, C20, the power supply, CR14 and to the top plate of C14. As C14 discharges, it slowly becomes discharged completely. That discharge will go on until the potential at Q2's collector (the going off transistor) reaches about 150 volts. About that time, C14 will be discharged. Capacitor C14 thus provides a diverting path for the current out of Q2 so that Q2 is not subject to high dissipation.

The high frequency power switching circuit of the present invention allows each channel 24 connected across the high frequency bus leads 23A and 23B to be modulated and regulated separately whereby the circuit performs only the function of chopping. The circuit can operate at about 4% of full load. Transformers T1, T2 and T3 use gapless toroidal cores. Inductances L1, L2 and L3 do not use gapless cores. Looking from the primary sides, T1 and T3 are step down transformers and T2 is a step up transformer.

I claim:

1. A high frequency power switching circuit for converting a DC voltage to a high frequency voltage, comprising:
   two power switching means coupled together,
   means for connecting a DC voltage across said two power switching means,
   a saturable timing transformer having a primary winding and two secondary windings,
   one of said secondary windings being coupled to one of said power switching means for driving said one power switching means,
   the other of said secondary windings being coupled to the other of said power switching means for driving said other power switching means,
   an output lead coupled to the junction of said two power switching means, and
   amplifier means having an input coupled to said output lead and an output coupled to said primary winding of said timing transformer,
   said amplifier means and said timing transformer being coupled in a positive feedback loop whereby said two power switching means, said amplifier means and said timing transformer form an oscillator for alternately switching said two power switching means on and off to convert said DC voltage to a high frequency voltage at said output lead,
   said amplifier means being operated as a limiter to insure that the going off power switching means is completely off before the going on transistor power switching means is on.

2. The high frequency power switching circuit of claim 1, comprising:
   a boost transformer having a primary winding connected to said output lead and a secondary winding connected in a series aiding configuration with the said primary winding of said timing transformer.

3. The high frequency power switching circuit of claim 2, comprising:
   circuitry coupled from said output lead to said primary winding of said timing transformer for applying to said primary winding of said timing transformer a DC signal having a polarity which is a function of the lack of symmetry of the voltage waveform at the junction of said two power switching means.

4. The high frequency power switching circuit of claim 2, wherein:
   said amplifier means is characterized such that an input may be applied thereto to change the level of its output such that said oscillator may be phase-locked to a given frequency.

5. The high frequency power switching circuit of claim 4, comprising:
   circuitry coupled from said output lead to said primary winding of said timing transformer for applying to said primary winding of said timing transformer a DC signal having a polarity which is a function of the lack of symmetry of the voltage waveform at the junction of said two power switching means.

6. The high frequency power switching circuit of claim 1, comprising:
   circuitry coupled from said output lead to said primary winding of said timing transformer for applying to said primary winding of said timing transformer a DC signal having a polarity which is a function of the lack of symmetry of the voltage waveform at the junction of said two power switching means.

7. The high frequency power switching circuit of claim 1, wherein:
   said amplifier means is characterized such that an input may be applied thereto to change the level of its output such that said oscillator may be phase-locked to a given frequency.

8. A high frequency power switching circuit for converting a DC voltage to a high frequency voltage, comprising:
   two power switching means coupled together,
   means for connecting a DC voltage across said two power switching means.
   a saturable timing transformer having a primary winding and two secondary windings,
   one of said secondary windings being coupled to one of said power switching means for driving said one power switching means,
   the other of said secondary windings being coupled to the other of said power switching means for driving said other power switching means,
   an output lead coupled to the junction of said two power switching means,
   amplifier means having an input coupled to said output lead and an output coupled to said primary winding of said timing transformer,
   said amplifier means and said timing transformer being coupled in a positive feedback loop whereby said two power switching means, said amplifier means and said timing transformer form an oscillator for alternately switching said two power switching means on and off to convert said DC voltage to a high frequency voltage at said output lead, and
   a boost transformer having a primary winding connected to said output lead and a secondary winding connected in a series aiding configuration with the said primary winding of said timing transformer.

9. The high frequency power switching circuit of claim 8, comprising:
   circuitry coupled from said output lead to said primary winding of said timing transformer for applying to said primary winding of said timing transformer a DC signal having a polarity which is a function of the lack of symmetry of the voltage wave form at the junction of said two power switching means.

10. The high frequency power switching circuit of claim 8, wherein:
    said amplifier means is characterized such that an input may be applied thereto to change the level of its output such that said oscillator may be phase-locked to a given frequency.

11. A high frequency power switching circuit for converting a DC voltage to a high frequency voltage, comprising:
    two power switching means coupled together,
    means for connecting a DC voltage across said two power switching means,
    a saturable timing transformer having a primary winding and two secondary windings,
    one of said secondary windings being coupled to one of said power switching means for driving said one power switching means,
    the other of said secondary windings being coupled to the other of said power switching means for driving said other power switching means, an output lead coupled to the junction of said two power switching means, amplifier means having an input coupled to said output lead and an output coupled to said primary winding of said timing transformer, said amplifier means and said timing transformer being coupled in a positive feedback loop whereby said two power switching means, said amplifier means and said timing transformer form an oscillator for alternately switching said two power switching means on and off to convert said DC voltage to a high frequency voltage at said output lead, and circuitry coupled from said output lead to said primary winding of said timing transformer for applying to said primary winding of said timing transformer a DC signal having a polarity which is a function of the lack of symmetry of the voltage waveform at the junction of said two power switching means.

12. The high frequency power switching circuit of claim 11, wherein:

said amplifier means is characterized such that an input may be applied thereto to change the level of its output such that said oscillator may be phase-locked to a given frequency.

13. A high frequency power switching circuit for converting a DC voltage to a high frequency voltage, comprising:

two power switching means coupled together, means for connecting a DC voltage across said two power switching means, a saturable timing transformer having a primary winding and two secondary windings, one of said secondary windings being coupled to one of said power switching means for driving said one power switching means, the other of said secondary windings being coupled to the other of said power switching means for driving said other power switching means, an output lead coupled to the junction of said two power switching means, and amplifier means having an input coupled to said output lead and an output coupled to said primary winding of said timing transformer, said amplifier means and said timing transformer being coupled in a positive feedback loop whereby said two power switching means, said amplifier means and said timing transformer form an oscillator for alternately switching said two power switching means on and off to convert said DC voltage to a high frequency voltage at said output lead.

said amplifier means is characterized such that an input may be applied thereto to change the level of its output such that said oscillator may be phase-locked to a given frequency.

14. A high frequency power switching circuit for converting a DC voltage to a high frequency voltage, comprising:

two power transistors with the emitter of one of said transistors connected to the collector of the other of said transistors, means for connecting a DC voltage across said two power transistors, a saturable timing transformer having a primary winding and two secondary windings, one of said secondary windings being coupled to one of said transistors for driving said one transistor, the other of said secondary windings being coupled to the other of said transistors for driving said other transistor, an output lead coupled to the junction of said two power transistors, an auxiliary transformer having a primary and two secondary windings, said output lead being coupled to said primary winding of said auxiliary transformer, amplifier means having an output coupled to said primary winding of said timing transformer, one of said secondary windings of said auxiliary transformer being coupled to an input of said amplifier means for applying a signal to said amplifier means representative of the output applied to said output lead, said auxiliary transformer, said amplifier means, and said timing transformer being coupled in a positive feedback loop whereby said two power transistors, said auxiliary transformer, said amplifier means, and said timing transformer form an oscillator for alternately switching said two power transistors on and off to convert said DC voltage to a high frequency voltage at said output lead, said amplifier means being operated as a limiter to insure that the going off transistor is completely off before the going on transistor is on, start circuit for initially starting the operation of said oscillator, and circuitry coupled to said one secondary winding of said auxiliary transformer and to said amplifier means to apply initial power to said amplifier means, the other of said secondary windings of said auxiliary transformer being coupled to said amplifier means for applying power thereto for biasing off said circuitry after said oscillator begins oscillating.

15. The high frequency power switching circuit of claim 14, comprising:

a boost transformer having a primary winding connected to said output lead and a secondary winding connected in a series aiding configuration with the said primary winding of said timing transformer.

16. The high frequency power switching circuit of claim 15 comprising:

circuitry coupled from said output lead to said primary winding of said timing transformer for applying to said primary winding of said timing transformer a DC signal having a polarity which is a function of the lack of symmetry of the voltage waveform at the junction of said two power switching means.

17. The high frequency power switching circuit of claim 15, wherein:

said amplifier means is characterized such that an input may be applied thereto to change the level of its output such that said oscillator may be phase-locked to a given frequency.

18. The high frequency power switching circuit of claim 17 comprising:

circuitry coupled from said output lead to said primary winding of said timing transformer for applying to said primary winding of said timing transformer a DC signal having a polarity which is a function of the lack of symmetry of the voltage waveform at the junction of said two power switching means.

19. The high frequency power switching circuit of claim 14, comprising:
circuitry coupled from said output lead to said primary winding of said timing transformer for applying to said primary winding of said timing transformer a DC signal having a polarity which is a function of the lack of symmetry of the voltage waveform at the junction of said two power switching means.

20. The high frequency power switching circuit of claim 14, wherein:
said amplifier means is characterized such that an input may be applied thereto to change the level of its output such that said oscillator may be phase-locked to a given frequency.

21. A high frequency power switching circuit for converting a DC voltage to a high frequency voltage, comprising:
two power transistors with the emitter of one of said transistors connected to the collector of the other of said transistors,
means for connecting a DC voltage across said two power transistors,
a saturable timing transformer having a primary winding and two secondary windings,
one of said secondary windings being coupled to one of said transistors for driving said one transistor, the other of said secondary windings being coupled to the other of said transistors for driving said other transistor,
an output lead coupled to the junction of said two power transistors,
an auxiliary transformer having a primary and two secondary windings,
said output lead being coupled to said primary winding of said auxiliary transformer,
amplifier means having an output coupled to said primary winding of said timing transformer,
one of said secondary windings of said auxiliary transformer being coupled to an input of said amplifier means for applying a signal to said amplifier means representative of the output applied to said output lead,
said auxiliary transformer, said amplifier means, and said timing transformer being coupled in a positive feedback loop whereby said two power transistors, said auxiliary transformer, said amplifier means, and said timing transformer form an oscillator for alternately switching said two power transistors on and off to convert said DC voltage to a high frequency voltage at said output lead,
start circuit for initially starting the operation of said oscillator,
circuitry coupled to said one secondary winding of said auxiliary transformer and to said amplifier means to apply initial power to said amplifier means,
the other of said secondary windings of said auxiliary transformer being coupled to said amplifier means for applying power thereto for biasing off said circuitry after said oscillator begins oscillating, and
a boost transformer having a primary winding connected to said output lead and a secondary winding connected in a series aiding configuration with the said primary winding of said timing transformer.

22. The high frequency power switching circuit of claim, 21 comprising:
circuitry coupled from said output lead to said primary winding of said timing transformer for applying to said primary winding of said timing transformer a DC signal having a polarity which is a function of the lack of symmetry of the voltage waveform at the junction of said two power switching means.

23. The high frequency power switching circuit of claim 21, wherein:
said amplifier means is characterized such that an input may be applied thereto to change the level of its output such that said oscillator may be phase-locked to a given frequency.

24. A high frequency power switching circuit for converting a DC voltage to a high frequency voltage, comprising:
two power transistors with the emitter of one of said transistors connected to the collector of the other of said transistors,
means for connecting a DC voltage across said two power transistors,
a saturable timing transformer having a primary winding and two secondary windings,
one of said secondary windings being coupled to one of said transistors for driving said one transistor, the other of said secondary windings being coupled to the other of said transistors for driving said other transistor,
an output lead coupled to the junction of said two power transistors,
an auxiliary transformer having a primary and two secondary windings,
said output lead being coupled to said primary winding of said auxiliary transformer,
amplifier means having an output coupled to said primary winding of said timing transformer,
one of said secondary windings of said auxiliary transformer being coupled to an input of said amplifier means for applying a signal to said amplifier means representative of the output applied to said output lead,
said auxiliary transformer, said amplifier means, and said timing transformer being coupled in a positive feedback loop whereby said two power transistors, said auxiliary transformer, said amplifier means, and said timing transformer form an oscillator for alternately switching said two power transistors on and off to convert said DC voltage to a high frequency voltage at said output lead,
start circuit for initially starting the operation of said oscillator,
circuitry coupled to said one secondary winding of said auxiliary transformer and to said amplifier means to apply initial power to said amplifier means,
the other of said secondary windings of said auxiliary transformer being coupled to said amplifier means for applying power thereto for biasing off said circuitry after said oscillator begins oscillating, and
circuitry coupled from said output lead to said primary winding of said timing transformer for applying to said primary winding of said timing transformer a DC signal having a polarity which is a function of the lack of symmetry of the voltage waveform at the junction of said two power switching means.

25. The high frequency power switching circuit of claim 24, wherein:
said amplifier means is characterized such that an input may be applied thereto to change the level of its output such that said oscillator may be phase-locked to a given frequency.

26. A high frequency power switching circuit for converting a DC voltage to a high frequency voltage, comprising:
two power transistors with the emitter of one of said transistors connected to the collector of the other of said transistors,
means for connecting a DC voltage across said two power transistors,
a saturable timing transformer having a primary winding and two secondary windings,
one of said secondary windings being coupled to one of said transistors for driving said one transistor,
the other of said secondary windings being coupled to the other of said transistors for driving said other transistor,
an output lead coupled to the junction of said two power transistors,
an auxiliary transformer having a primary and two secondary windings,
said output lead being coupled to said primary winding of said auxiliary transformer,
amplifier means having an output coupled to said primary winding of said timing transformer,
one of said secondary windings of said auxiliary transformer being coupled to an input of said amplifier means for applying a signal to said amplifier means representative of the output applied to said output lead,
said auxiliary transformer, said amplifier means, and said timing transformer being coupled in a positive feedback loop whereby said two power transistors, said auxiliary transformer, said amplifier means, and said timing transformer form an oscillator for alternately switching said two power transistors on and off to convert said DC voltage to a high frequency voltage at said output lead,
start circuit for initially starting the operation of said oscillator, and
circuitry coupled to said one secondary winding of said auxiliary transformer and to said amplifier means to apply initial power to said amplifier means,
the other of said secondary windings of said auxiliary transformer being coupled to said amplifier means for applying power thereto for biasing off said circuitry after said oscillator begins oscillating,
said amplifier means being characterized such that an input may be applied thereto to change the level of its output such that said oscillator may be phase-locked to a given frequency.

27. A high frequency power switching circuit for converting a DC voltage to a high frequency voltage, comprising:
two power switching means coupled together,
means for connecting a DC voltage across said two power switching means,
a saturable timing transformer having a primary winding and two secondary windings,
one of said secondary windings being coupled to one of said power switching means for driving said one power switching means,
the other of said secondary windings being coupled to the other of said power switching means for driving said other power switching means,
an output lead coupled to the junction of said two power switching means,
amplifier means having an input coupled to said output lead and an output coupled to said primary winding of said timing transformer,
said amplifier means and said timing transformer being coupled in a positive feedback loop whereby said two power switching means, said amplifier means and said timing transformer form an oscillator for alternately switching said two power switching means on and off to produce voltage pulses at a high frequency at said output lead,
in response to the output of said amplifier means, said timing transformer periodically becomes saturated during the operation of said oscillator,
each time said timing transformer becomes saturated the on power switching means subsequently goes off,
said amplifier means, in response to the voltage level at said output lead as the on power switching means goes off, causes said timing transformer to switch the other power switching means on after the previously on power switching means goes off.

28. The high frequency power switching circuit of claim 27, wherein:
the basic period of oscillation of said oscillator is set by the amount of current established on an input of said amplifier means,
the frequency of operation of said oscillator being also a function of the amplitude of the voltage applied to the primary of said timing transformer,
circuitry coupled from said output lead to said primary winding of said timing transformer for applying to said primary winding of said timing transformer a DC signal having a polarity which is a function of the lack of symmetry of the voltage waveform at the junction of said two transistors.

29. The high frequency power switching circuit of claims 27 or 28, comprising:
a boost transformer having a primary winding connected to said output lead and a secondary winding connected in a series aiding configuration with the said primary winding of said timing transformer.

30. A high frequency power switching circuit for converting a DC voltage to a high frequency voltage, comprising:
two transistors with the emitter of one of said transistors connected to the collector of the other of said transistors,
means for connecting a DC voltage across said two transistors,
a saturable timing transformer having a primary winding and two secondary windings,
one of said secondary windings being coupled to one of said transistors for driving said one transistor,
the other of said secondary windings being coupled to the other of said transistors for driving said other transistor,
an output lead coupled to the junction of said two transistors,
an auxiliary transformer having a primary winding and a secondary winding,
said output lead being coupled to said primary winding of said auxiliary transformer, amplifier means having an output coupled to said primary winding of said timing transformer, said secondary winding of said auxiliary transformer being coupled to an input of said amplifier means, said auxiliary transformer, said amplifier means, and said timing transformer being coupled in a positive feedback loop whereby said two transistors, said auxiliary transformer, said amplifier means, and said timing transformer form an oscillator for alternately switching said two transistors on and off to produce voltage pulses at a high frequency at the junction of said two transistors, said amplifier means being of the type capable of switching to two different conduction states such that in one conduction state one of said transistors through transformer action of said primary transformer is switched on and in the other conduction state, the other of said transistors through transformer action of said timing transformer is switched on, during each conduction state of said amplifier means, said timing transformer becomes saturated such that the on transistor goes off causing said amplifier means by way of said auxiliary transformer to switch states resulting in the other transistor going on whereby the on transistor is switched off before the off transistor is switched on.

31. The high frequency power switching circuit of claim 30 wherein:

as said timing transformer becomes saturated during a conduction state of said amplifier means, resulting in said one transistor being switched from on to off, the drop in voltage at said junction resulting from said one transistor being switched off causes said amplifier means to switch states which by transformer action of said timing transformer causes said other transistor to be switched from off to on after said one transistor is switched off, as said timing transformer becomes saturated during the next conduction state of said amplifier means, resulting said other transistor being switched off, the increase in voltage at said junction resulting from said other transistor being switched off causes said amplifier means to switch states which by way of transformer action of said timing transformer causes said one transistor to be switched on after said other transistor is switched off.

32. The high frequency power switching circuit of claim 30 wherein:

the basic period of oscillation of said oscillator is set by the amount of current established on an input of said amplifier means, the frequency of operation of said oscillator being also a function of the amplitude of the voltage applied to the primary of said timing transformer, circuitry coupled from said output lead to said primary winding of said timing transformer for applying to said primary winding of said timing transformer a DC signal having a polarity which is a function of the lack of symmetry of the voltage waveform at the junction of said two transistors.

33. The high frequency power switching circuit of claim 31 wherein:

the basic period of oscillation of said oscillator is set by the amount of current established on an input of said amplifier means, the frequency of operation of said oscillator being also a function of the amplitude of the voltage applied to the primary of said timing transformer, circuitry coupled from said output lead to said primary winding of said timing transformer for applying to said primary winding of said timing transformer a DC signal having a polarity which is a function of the lack of symmetry of the voltage waveform at the junction of said two transistors.

34. The high frequency power switching circuit of claims 30, 31, 32, or 33 comprising:

a boost transformer having a primary winding connected to said output lead and a secondary winding connected in a series aiding configuration with the said primary winding of said timing transformer.

* * * * *